March 18, 1924.
T. BURGESS
BRACE FOR AUTOMOBILE FENDERS
Filed April 17, 1922
1,486,948
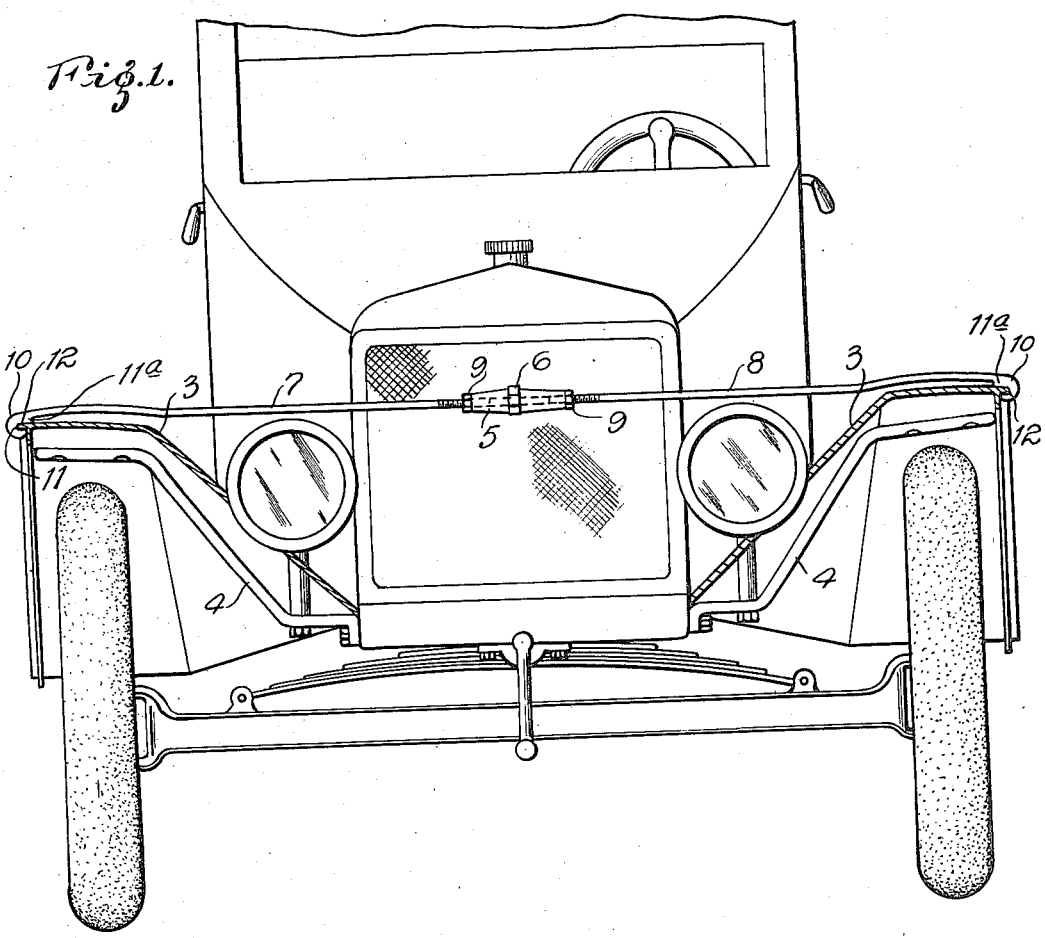
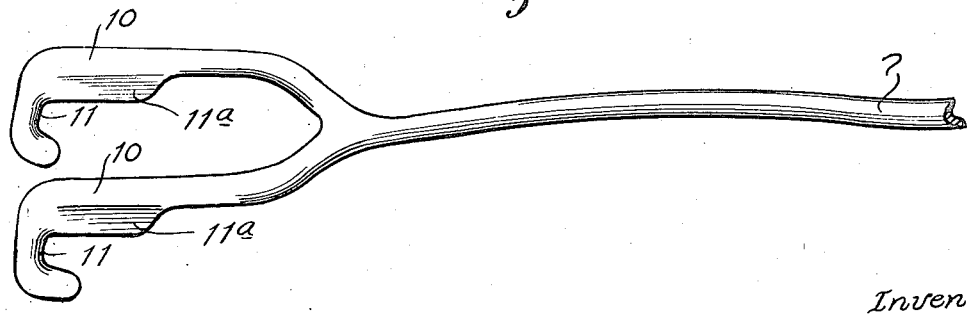
Inventor:
Thomas Burgess.
By Edward E. Longan
Attorney.

Patented Mar. 18, 1924.

1,486,948

UNITED STATES PATENT OFFICE.

THOMAS BURGESS, OF VANDALIA, MISSOURI, ASSIGNOR OF ONE-HALF TO JOHN B. CRUM, OF VANDALIA, MISSOURI.

BRACE FOR AUTOMOBILE FENDERS.

Application filed April 17, 1922. Serial No. 553,867.

*To all whom it may concern:*

Be it known that I, THOMAS BURGESS, a citizen of the United States, and resident of the city of Vandalia, county of Audrain, and State of Missouri, have invented certain new and useful Improvements in Braces for Automobile Fenders, of which the following is a specification, containing a full, clear, and exact description, reference being had to the accompanying drawings, forming a part hereof.

My invention relates to certain new and useful improvements in braces for automobile fenders, and has for its primary object the construction of an auxiliary brace which may be easily and readily applied to automobile fenders and adjusted thereon, so as to brace the fenders and prevent their vibration, and becoming loose and broken from their stationary supports.

In the drawings,

Fig. 1 is a front view of an automobile of the Ford type, showing my improvement applied to the fenders thereof, the fenders being shown in section.

Fig. 2 is an enlarged perspective view of one of the hooks.

Referring to the drawings:

3 indicates the fenders of the usual construction, and 4 indicates the stationary supports therefor.

My improvement consists of the employment of a turn buckle 5 provided in one end with a left hand screw threaded bore, and in the opposite end with a right-hand screw threaded bore. The turn buckle is provided with an angular portion 6, by means of which a wrench may be applied for adjusting the same. Mounted in the left-hand threaded bore is a rod 7 provided on its inner end with screw threads, and 8 indicates a similar rod provided on its inner end with screw threads. Mounted on the rods 7 and 8 adjacent the turn buckle 5 are jam or lock nuts 9. The outer ends of the rods are bifurcated, the ends of these bifurcations are formed into hooks 10. Each of these hooks is provided with a recess 11 adapted to receive the edge 12 of the fenders, and with the shoulders 11ª.

By means of this construction the hooks are held slightly away from the top surface of the fenders, so as to prevent marring or scarring of the same. The hooks on the rods 7 and 8 may be forged or formed integral therewith, or they may be cast separately if desired, and attached to the rods. The double hooks are desirable because they prevent the turning of the rods in the adjustment of the device. The rods 7 and 8 are slightly bowed upwardly adjacent the hooks so as to clear the top surface of the fenders. These bowed portions are shaped to conform to the top surfaces of various styles of fenders.

In the operation of my device, the hooks are engaged over the edge of the fenders as illustrated in Fig. 1, and then the turn buckle 5 is adjusted as desired. The device when thus applied and adjusted coacts with the stationary supports 4 secured underneath the fenders, and eliminates the vibration of the fenders and prevents them from becoming torn loose from the machine.

My device may be applied to any style of fender and is used as an auxiliary support or brace therefor, and obviates the objections and performs the functions noted. By means of the jam or lock nuts 9, the turn buckle is held in the desired adjustment.

Having fully described my invention, what I claim is:

A support for automobile fenders comprising the combination with a pair of fenders and stationary supports secured to the underneath side of said fenders, of a longitudinally adjustable support comprising a pair of bifurcated hooks having shoulders adapted to engage the outer edges of the fenders and having the portion adjacent the shoulders upwardly bowed, a turn buckle for adjusting said adjustable support and jam nuts for holding said turn buckle in an adjusted position, said stationary supports and said adjustable support co-acting to prevent the jarring and loosening of the fenders.

In testimony whereof, I have signed my name to this specification.

THOMAS BURGESS.